US008554281B2

(12) United States Patent
Scott et al.

(10) Patent No.: US 8,554,281 B2
(45) Date of Patent: *Oct. 8, 2013

(54) HANDHELD ELECTRONIC DEVICE INCLUDING AUTOMATIC SELECTION OF INPUT LANGUAGE, AND ASSOCIATED METHOD

(75) Inventors: Sherryl Lee Lorraine Scott, Toronto (CA); Jason T. Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/884,894

(22) Filed: Sep. 17, 2010

(65) Prior Publication Data

US 2011/0003620 A1 Jan. 6, 2011

Related U.S. Application Data

(63) Continuation of application No. 11/430,330, filed on May 9, 2006, now Pat. No. 7,822,434.

(51) Int. Cl.
*H04B 1/38* (2006.01)

(52) U.S. Cl.
USPC ..... 455/566; 455/550.1; 455/575; 455/414.1; 455/432.2; 370/259; 370/260; 370/261; 370/262; 370/263; 370/264; 370/265; 370/266; 370/267; 370/268; 379/157; 379/158

(58) Field of Classification Search
USPC ............... 455/414.1, 414.4, 432.2, 432.3, 455/550.1–575.9; 370/259–271; 379/157–158
See application file for complete search history.

(56) References Cited

U.S. PATENT DOCUMENTS 6,243,681 B1 6/2001 Guji et al.
6,469,713 B2 10/2002 Hetherington et al.
(Continued)

FOREIGN PATENT DOCUMENTS

| EP | 1168859 A1 | 1/2002 |
| EP | 1349352 | 1/2003 |
| EP | 1480420 A1 | 11/2004 |
| EP | 1524870 A1 | 4/2005 |

OTHER PUBLICATIONS

Office Action, dated Feb. 11, 2010, issued from the Canadian Patent Office for Canadian Patent Application No. 2,587,282 (4 pages).

(Continued)

*Primary Examiner* — Kamran Afshar
*Assistant Examiner* — Sayed T Zewari
(74) *Attorney, Agent, or Firm* — Finnegan, Henderson, Farabow, Garrett & Dunner LLP

(57) ABSTRACT

A method of automatically establishing an input language for a handheld electronic device includes receiving a request to initiate the composition of a new message, receiving a selection of a particular contact that is the intended recipient of the message, and determining whether the particular contact has a stored preferred input language. If a preferred input language is stored, the method includes determining whether the preferred input language is different than the current input language (which may be a pre-established default input language). If the preferred input language is different, the method further includes switching the current input language to the preferred input language. Also provided is an improved handheld electronic device having one or more routines adapted to implement the method. Also provided is a method of indicating a preferred language in association with a call received by or placed to the device.

20 Claims, 3 Drawing Sheets

(56) References Cited

U.S. PATENT DOCUMENTS

| | | |
|---|---|---|
| 7,440,441 B2 | 10/2008 | Lakhani et al. |
| 2002/0111155 A1 | 8/2002 | Ando |
| 2005/0267738 A1 | 12/2005 | Wilkinson et al. |
| 2006/0119583 A1 | 6/2006 | Potera |

OTHER PUBLICATIONS

Office Action, dated Jan. 21, 2011, issued from the Canadian Patent Office for Canadian Patent Application No. 2,587,282 (3 pages).

US 8,554,281 B2

HANDHELD ELECTRONIC DEVICE INCLUDING AUTOMATIC SELECTION OF INPUT LANGUAGE, AND ASSOCIATED METHOD

This application is a continuation of application Ser. No. 11/430,330, filed May 9, 2006 now U.S. Pat. No. 7,822,434, which is incorporated herein by reference.

BACKGROUND

1. Technical Field

The embodiments described herein relate generally to handheld electronic devices and, more particularly, to a handheld electronic device and associated method that provide for the automatic selection of an input language based upon a particular selected contact.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

Such handheld electronic devices typically include a number of tools that facilitate the input of text information, such as when a user is composing an email message. For example, many handheld electronic devices include spell checking and/or grammar checking functionality that help users to correct spelling and/or grammar errors made by the user while inputting text. In addition, handheld electronic devices are generally intended to be portable, and thus efforts have been made to provide handheld electronic devices with progressively smaller form factors. One way in which to reduce the form factor of handheld electronic devices is to provide a "reduced keyboard" in which multiple letters, symbols, and/or digits are assigned to any given key (e.g., a reduced QWERTY keyboard). Since a single actuation of a key in a "reduced keyboard" potentially could be intended by the user to refer to any of the symbols thereon, the input (by actuation of the key) generally is an ambiguous input and is in need of some type of disambiguation in order to be useful for text entry purposes. Numerous keystroke interpretation systems have been proposed for this purpose, an example of which is a software-based text disambiguation function. In such a system, a user typically presses keys to which one or more characters have been assigned, generally pressing each key one time for each desired letter, symbol, or digit, and the disambiguation software attempts to predict the intended input. One example of such a system is disclosed in commonly owned U.S. patent application Ser. No. 10/931,281, entitled "Handheld Electronic Device with Text Disambiguation."

As will be appreciated, spell and grammar checking systems and software-based text disambiguation systems are language dependent. Since it is possible that users of handheld electronic devices may want to communicate, and thus input text, in a number of different languages, many handheld electronic devices are provided with spell and grammar checking systems and/or software-based text disambiguation systems that facilitate the entry of text in different languages.

In order to facilitate the selective use of different languages, handheld electronic devices are typically provided with a language mode selection option wherein a user selects the current input language for the device, and thereafter all text input is in the chosen language and the spell and grammar checking system and/or software-based text disambiguation system of the handheld electronic device will function accordingly. As will be appreciated, users typically communicate with a given contact in a particular language. Thus, if a user desires to send an email message to a contact that speaks French, the user can place the handheld electronic device in the French language mode, and then begin composing a new email message in French. This is typically done by accessing an options menu and selecting or inputting the desired language.

The approach just described presents a number of problems. First, it requires a number of affirmative steps prior to composing the new email message, which the user may either initially forget to perform (the user will, for example, begin inputting text in French while the device is still in the English language mode) or which, in the least, are time consuming and inconvenient. Also, when the user is finished composing the message, he or she must take additional affirmative steps to switch the language mode back to the desired normal (default) mode that the user prefers. Again, these steps are time consuming and inconvenient, and, in some cases, the user may forget to perform them such that the next time he desires to input text, the device will still be in the previously selected, non-default language mode. Thus, there is a need for a system for automatically selecting an input language for a handheld electronic device that eliminates these problems.

BRIEF DESCRIPTION OF THE DRAWINGS

A full understanding of the invention can be gained from the following Description of the Preferred Embodiment when read in conjunction with the accompanying drawings in which.

DESCRIPTION OF THE PREFERRED EMBODIMENTS

A method of automatically establishing an input language for a handheld electronic device that stores contact information for a plurality of contacts is provided. The method includes receiving a request to initiate the composition of a new message, such as an email, SMS or MMS message, receiving a selection of a particular contact that is the intended recipient of the message, and determining whether the particular contact has a preferred input language stored by said handheld electronic device in connection therewith. If a preferred input language is stored, the method includes determining whether the preferred input language is different than the current input language (which may be a pre-established default input language) of the handheld electronic device. If the preferred input language is different, the method further includes switching the current input language to the preferred input language. Preferably, a visual indicator is provided that indicates that a language switch has occurred. The step of receiving a request may be performed before or after the step of receiving a selection. The method may include switching the current input language back to the default input language after the composition of the message is completed. Also provided is an improved handheld electronic device having one or more routines adapted to implement the method described above.

Figure 1:
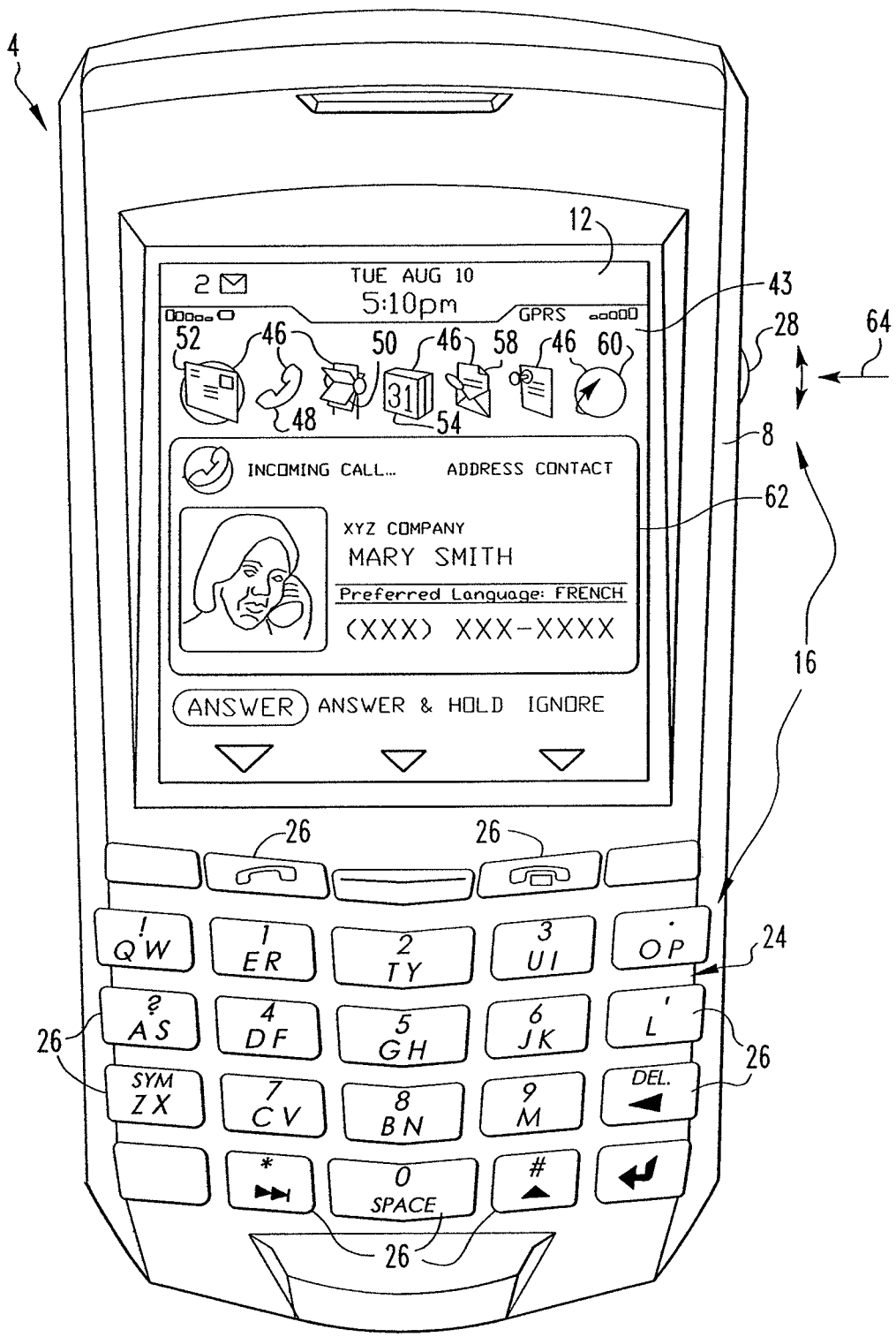
FIG. 1 is a front view of an improved handheld electronic device according to one embodiment.
Figure 2:
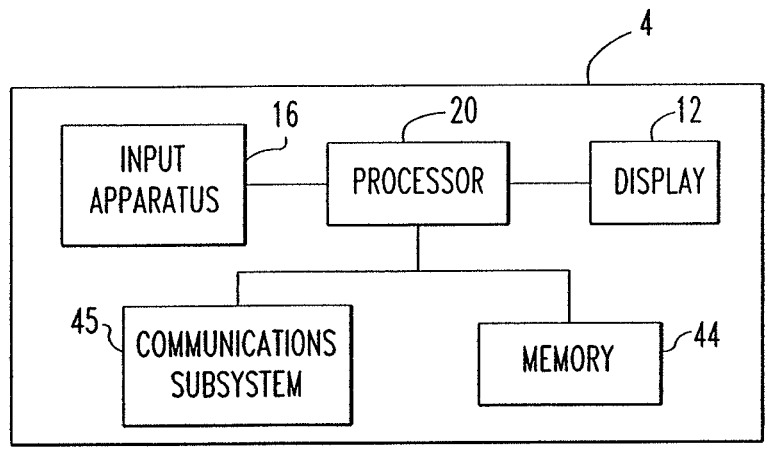
FIG. 2 is a block diagram of the handheld electronic device of FIG. 1.

An embodiment of an improved handheld electronic device 4 is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. Examples of handheld electronic devices are included in U.S. Pat. Nos. 6,452,588 and 6,489,950. The handheld electronic device 4 may be of a type that includes tools that facilitate the input of text information, such as, for example, a spell and grammar checking system or a software-based text disambiguation system. This is not, however, necessary, as the present concept may be used in any text input mode. As will be described in greater detail below, the handheld electronic device 4 provides for the automatic selection of an input language based upon a particular selected contact.

As can be understood from FIG. 1, the input apparatus 16 includes a keyboard 24 having a plurality of keys 26, and a rotatable trackwheel 28. As used herein, the expression "key" and variations thereof shall refer broadly to any of a variety of input members such as buttons, switches, and the like without limitation. The keys 26 and the rotatable trackwheel 28 are input members of the input apparatus 16, and each of the input members has a function assigned thereto. Keys 26 include a <SEND> key 30 and an <END> key 32 for initiating and terminating phone calls. The keys 30, 32 may include suitable text and/or graphics (as shown) disposed (e.g., printed) thereon.

As is shown in FIG. 2, the processor 20 is in electronic communication with a memory 44. The memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of routines executable by the processor 20 for the processing of data. The routines can be in any of a variety of forms such as, without limitation, software, firmware, and the like, and may include one or more subroutines, processes, procedures, function calls or the like, alone or in combination. The routines preferably include a software-based text disambiguation function as described elsewhere herein as an application. The software-based text disambiguation function may, in one embodiment, be as described in commonly owned U.S. patent application Ser. No. 10/931,281, entitled "Handheld Electronic Device with Text Disambiguation." In addition, the routines also preferably include a spell and grammar checking system, such as those that are well known in the art.

As is also shown in FIG. 2, the processor 20 is in electronic communication with a communications subsystem 45. Communications functions for handheld electronic device 4, including data and voice communications, are performed through the communications subsystem 45. The communications subsystem 45 includes a transmitter and a receiver (possibly combined in a single transceiver component) and one or more antennas. Other known components, such as a digital signal processor and a local oscillator, may also be part of communications subsystem 45. The specific design and implementation of the communications subsystem 45 is dependent upon the communications network in which the handheld electronic device 4 is intended to operate. For example, the handheld electronic device 4 may include a communications subsystem 45 designed to operate with the Mobitex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with the handheld electronic device 4.

In FIG. 1, the display 12 is depicted as displaying a home screen 43 that includes a number of applications depicted as discrete icons 46 (stored in the memory 44 and executable by the processor 20), including an icon representing a phone application 48, an address book application 50 for storing information for a plurality of contacts, a messaging application 52 which includes email, SMS and MMS applications, a calendar application 54, a memo application 56 for enabling a user to create documents and to record notes, lists and the like, a task application 58 for enabling a user to create and manage lists of tasks, and a browser application 60 for accessing and navigating the Internet.

In FIG. 1, the home screen 43 is currently active and would constitute a portion of an application. In addition, the display 12 shown in FIG. 1 shows a dialog box 62 that indicates that there is currently a phone call coming into the handheld electronic device 4. Dialog box 62 provides certain information relating to the incoming call, including, for example, the caller's phone number and identifying information if the caller and phone number are stored as a contact by address book application 50 of handheld electronic device 4. Other applications, such as phone application 48, address book application 50, messaging application 52, calendar application 54, memo application 56, task application 58 or browser application 60, can be initiated from the home screen 43 by providing an input through the input apparatus 16, such as by rotating the trackwheel 28 and providing a selection input by translating the trackwheel 28 in the direction indicated by the arrow 64 in FIG. 1.

Figure 3:
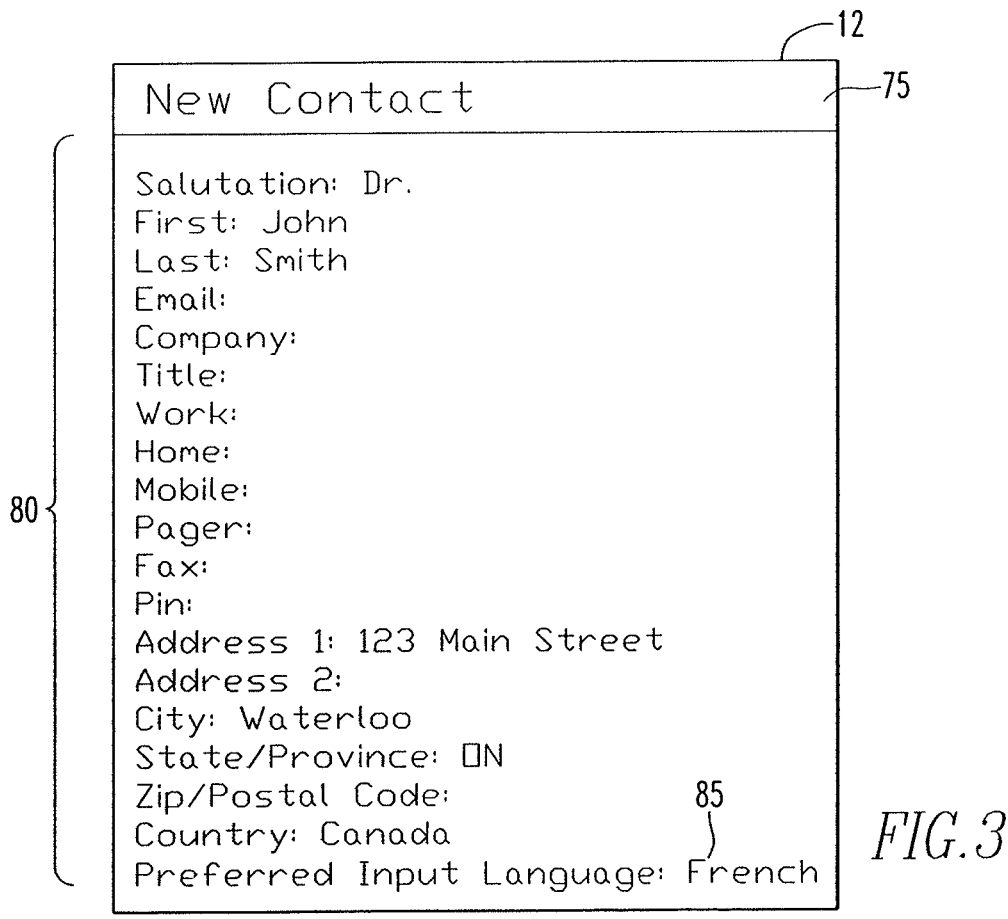
FIG. 3 shows a "new contact" screen that is provided on the display of the handheld electronic device of FIG. 1 that enables the entry of information for a new contact in the address book application of the handheld electronic device of FIG. 1.

As is known in the art, the address book application 50 allows the user of the handheld electronic device 4 to store contact related information for a number of contacts. That information is normally stored in a number of data fields and may include, among other things, a salutation to be used for the contact and the contact's first name, last name, email address, company name, title, work phone number, home phone number, mobile phone number, fax number, pager number, address (often broken into two fields), city, state/province, ZIP/postal code, and country name. In addition, in the embodiments described herein, the contact related information that may be stored includes a preferred input language for the particular contact. For example, if the contact is French and prefers to communicate in the French language, a user of the handheld electronic device 4 may store French as the preferred input language in a preferred language data field. FIG. 3 shows a "new contact" screen 75 that is provided by the processor 20 on display 12 that enables the entry of information in particular fields 80 using input apparatus 16, including a preferred language data field 85. Alternatively, a similar "edit contact" screen may be utilized to edit and or add information for existing contacts, including information to be stored in the preferred language data field. The manner in which the information stored in the preferred language data field is used in the present embodiments is described below in connection with FIG. 4.

Figure 4:
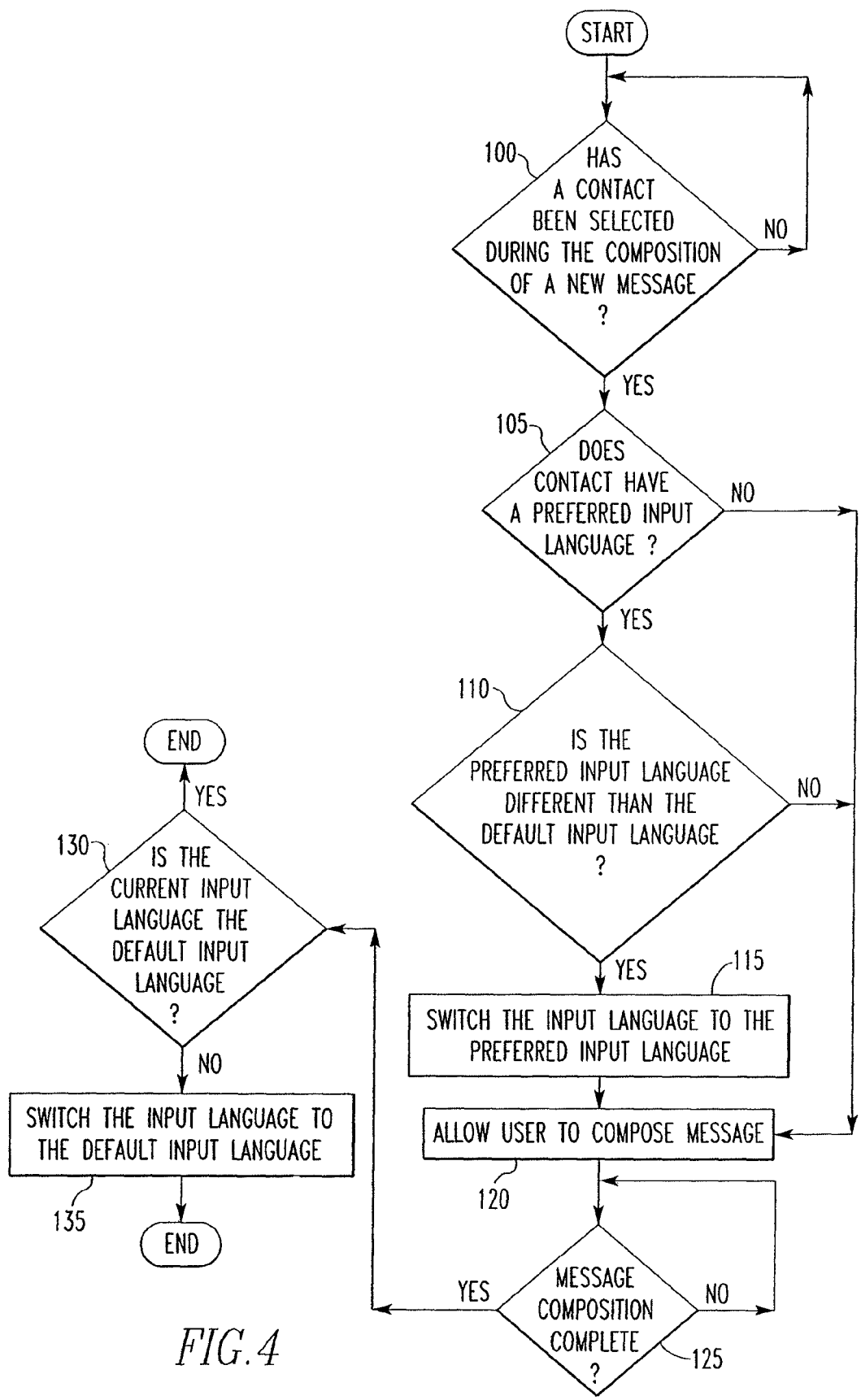
FIG. 4 is a flow chart of a method according to one embodiment for providing for the automatic selection of an input language for the handheld electronic device of FIG. 1 based upon a particular selected contact stored by the address book application of the handheld electronic device of FIG. 1.

FIG. 4 is a flow chart of a method according to one embodiment for providing for the automatic selection of an input language based upon a particular selected contact stored by the address book application 50. One or more particular routines that implement the method as generally described are preferably stored in memory 44 and are executable by processor 20. The method begins at step 100, wherein a determination is made as to whether a user of the handheld electronic device 4 has initiated the composition of a new message, such as an email, SMS or MMS message, and has selected a particular contact stored by the address book application 50 as the recipient of the message. This may be done, for example, by entering a contact's name in the "To" field of an email message. Next, at step 105, a determination is made as to whether the selected contact has a preferred input language that has been stored in the preferred language data field for that contact. If the answer is no, then the method proceeds to step 120, wherein the user is allowed to compose the message.

If, however, the answer at step 105 is yes, then at step 110, a determination is made as to whether the preferred input language for the selected contact is different than the default input language established for the handheld electronic device 4. If the answer is no, then the method proceeds to step 120. If the answer at step 110 is yes, then, at step 115, the input language for the handheld electronic device 4 is switched to the preferred input language for the selected contact. For example, if the default input language for the handheld electronic device 4 is English, and the preferred input language for the selected contact is French, the input language for the handheld electronic device 4 will be switched from English to French. Next, at step 120, the user is allowed to compose the new message. The user will at this point input text in the appropriate language (optionally, a pop-up dialog box may be provided on the display 12 to remind the user of the current input language; other indications may also be provided, such as a voice reminder). During this text input, the spell and grammar checking system and the software-based text disambiguation, if included, will be automatically set to function in a mode corresponding to the current input language of the handheld electronic device 4, i.e., the default input language or the preferred input language of the selected contact, whichever the case may be.

At step 125, a determination is made as to whether the message composition is complete. If not, then the method returns to step 125 and effectively waits for the message composition to be completed. When it is complete (i.e., a yes answer at step 125), the method proceeds to step 130. At step 130, a determination is made as to whether the current input language of the handheld electronic device 4 is the same as the established default input language for the handheld electronic device 4. If the answer is yes, meaning that the input language was not previously switched, then the method ends. If the answer is no, meaning that the input language was previously switched to a preferred input language of a selected contact, then, at step 135, the current input language of the handheld electronic device 4 is switched back to the established default input language, and thereafter the method ends (optionally, a pop-up dialog box may be provided on the display 12 to remind the user of the current input language, i.e., the default input language; other indications may also be provided, such as a voice reminder). Thus, as will be appreciated, the method shown in FIG. 4 eliminates the problems associated with prior art multi-language capable devices by automatically setting the input language to a pre-established preferred input language for a particular selected contact.

The concept described herein is not limited to the creation of new messages to be sent to a selected contact. As an alternative; the same method may be used when replying to a message previously received from a particular contact in the address book application if that contact has a preferred input language.

According to a further aspect of the concept described herein, if two or more contacts are selected that each have a different preferred input language, or if a reply is being generated to a message that will be sent to two or more contacts that each have a different preferred input language (e.g., in a "reply to all" mode), a dialog box is provided on the display 12 of the handheld electronic device 4 that lists each contact and their preferred input language. The user may then select, preferably in response to a prompt provided in the dialog box, which input language they wish to use for the message.

According to yet a further aspect of the concept described herein, when a user places a call to or receives a call from a contact in the address book application, a determination is made as to whether that contact has a preferred input language specified. If the contact does have a preferred input language, a pop-up window is provided on the display 12 of the handheld electronic device 4 that specifies the preferred language (see, for example, FIG. 1). Alternatively, an audible indicator (e.g., synthesized voice) of the preferred language may be provided instead of or in addition to the pop-up window. As a result, the user will be reminded that he or she should initiate or answer the phone call, whichever the case may be, in the preferred language. This may be helpful to, for example, a salesperson to improve a relationship with a customer that speaks a language other than the native language of the salesperson.

While preferred embodiments have been described and illustrated above, it should be understood that these are exemplary and are not to be considered as limiting. Additions, deletions, substitutions, and other modifications can be made without departing from the spirit or scope hereof. Accordingly, the invention is not to be considered as limited by the foregoing description but is only limited by the scope of the appended claims.

What is claimed is:

1. A method of automatically establishing an input language for a handheld electronic device that stores contact information for a plurality of contacts, comprising:

receiving a request to initiate composition of a new message to a particular one of said contacts and one or more additional ones of said contacts, each of said particular one of said contacts and said one or more additional contacts having a respective preferred input language stored by said handheld electronic device and each of said particular one of said contacts and said one or more additional contacts being intended recipients of said new message;

responsive to receiving said request, displaying contact information reflecting said particular one of said contacts and one or more additional ones of said contacts and each respective preferred input language;

receiving a selection of a particular preferred input language from among said displayed respective preferred input languages;

determining whether said particular preferred input language is different than a default input language of said handheld electronic device;

if it is determined that the particular preferred input language is different than the default input language, switching a current input language of said handheld electronic device to said particular preferred input language; and if it is determined that the composition of the new message is complete and the particular preferred input language is different than the default input language, switching the current input language of said handheld electronic device back to the default input language.

2. The method according to claim 1, wherein said receiving step comprises creating a reply to a previously received message, said reply being said new message.

3. The method according to claim 2, wherein said previously received message was sent by said particular one of said contacts and wherein said one or more additional ones of said contacts received copies of said previously received message.

4. The method according to claim 2, wherein said previously received message was sent by one of said one or more additional ones of said contacts and wherein said particular one of said contacts received a copy of said previously received message.

5. The method according to claim 1, wherein said step of receiving a request is performed prior to said step of receiving a selection.

6. The method according to claim 1, wherein said step of receiving a selection is performed prior to said step of receiving a request.

7. The method according to claim 1, wherein said new message is one of an email message, an SMS message and an MMS message.

8. A handheld electronic device, comprising:
a processor;
a memory in electronic communication with said processor, said memory storing an address book application executable by said processor for storing contact information for a plurality of contacts, said memory further storing one or more routines executable by said processor, said one or more routines being adapted to:
receive a request to initiate composition of a new message to a particular one of said contacts, said particular one of said contacts being an intended recipient of said message;
determine whether said particular one of said contacts has a preferred input language stored by said address book application;
if it is determined said particular one of said contacts has a preferred input language stored by said address book application in connection therewith, determine whether said preferred input language is different than a default input language of said handheld electronic device;
if it is determined that the preferred input language is different than the default input language, switch a current input language of said handheld electronic device to said preferred input language; and
if it is determined that the composition of the new message is complete and the particular preferred input language is different than the default input language, switch the current input language of said handheld electronic device back to the default input language.

9. The handheld electronic device according to claim 8, wherein said one or more routines are further adapted to receive a selection of said particular one of said contacts.

10. The handheld electronic device according to claim 8, wherein said request to initiate the composition of a new message comprises a request to create a reply to a message received from said particular one of said contacts.

11. The method according to claim 8, wherein said new message is one of an email message, an SMS message and an MMS message.

12. A method of operating a handheld electronic device that stores contact information for a plurality of contacts, comprising:
detecting a phone call either placed by or received by said handheld electronic device, said phone call being associated with a particular one of said contacts;
determining whether contact information stored in said handheld device indicates that said particular one of said contacts has a preferred language; and
if it is determined that said particular one of said contacts has a preferred language, outputting an indication of said preferred language while said phone call is in progress.

13. The method according to claim 12, wherein said indication is provided on a display of the handheld electronic device.

14. The method according to claim 12, wherein said indication is provided audibly.

15. A method of operating a handheld electronic device that stores contact information for a plurality of contacts, comprising:
detecting a phone call either placed by or received by said handheld electronic device, said phone call being associated with a particular one of said contacts;
in response to detecting said phone call, determining whether said particular one of said contacts has a preferred language; and
if it is determined that said particular one of said contacts has a preferred language, providing information reflecting said preferred language while said phone call is in progress.

16. The method according to claim 15, wherein said information is provided visually on a display of said handheld electronic device.

17. The method according to claim 15, wherein said information is provided audibly.

18. The method according to claim 15, wherein said information is a name of said preferred language.

19. A method for managing a handheld communication device, the method comprising:
storing contact information in the communication device enabling the identification of individuals and for each of at least some of the individuals a preferred language for communication;
receiving a request to communicate with a particular individual;
determining from the stored contact information whether the particular individual has a preferred language for communication; and
based on the determination, reconfiguring the communication device as necessary to enable communication with the particular individual, wherein the reconfiguring comprises:
if it is determined that the particular individual has a preferred language for communication:
determining whether said preferred language is different than a default input language of said handheld communication device;
if it is determined that the preferred language is different than the default input language, switching a current input language of said handheld communication device to said preferred language; and
if it is determined that the communication is complete and the particular preferred input language is different than the default input language, switching the current input language of said handheld electronic device back to the default input language.

20. The method of claim 19, wherein the reconfiguring further comprises:
   if it is determined that the particular individual does not have a preferred language for communication, retaining language input settings for character input operations of the device in accordance with the default language.

* * * * *